United States Patent [19]

Kassai

[11] Patent Number: 4,542,916
[45] Date of Patent: Sep. 24, 1985

[54] MECHANISM FOR LOCKING THE OPENED STATE OF A BABY CARRIAGE

[75] Inventor: Kenzou Kassai, Osaka, Japan

[73] Assignee: Kassai Kabushikikaisha, Osaka, Japan

[21] Appl. No.: 549,270

[22] Filed: Nov. 4, 1983

[30] Foreign Application Priority Data

Nov. 6, 1982 [JP] Japan .................................. 57-195143

[51] Int. Cl.⁴ .............................................. B62B 7/08
[52] U.S. Cl. .................................... 280/642; 280/658; 280/47.38
[58] Field of Search ............... 280/642, 644, 647, 649, 280/650, 657, 658, 47.38

[56] References Cited

U.S. PATENT DOCUMENTS 2,341,117  2/1944  Reinholz .............................. 280/644
3,918,734  11/1975  Firth .................................... 280/650

FOREIGN PATENT DOCUMENTS 1576574  10/1980  United Kingdom ................. 280/644
42-81977  4/1977  Japan .................................... 280/650

Primary Examiner—Joseph F. Peters, Jr.
Assistant Examiner—Everett G. Diederiks, Jr.
Attorney, Agent, or Firm—W. G. Fasse; D. H. Kane, Jr.

[57] ABSTRACT

A foldable baby carriage has a pair of front legs (17), a pair of rear legs (13) and a pair of pusher rods (2). In the opened state of the baby carriage, the rear legs extend from upper front to lower rear and the pusher rods extend rearwardly upward from the intermediate regions of the rear legs. Each rear leg is connected to the associated pusher rod by a support plate (12) which is connected between the intermediate region (14) of the rear leg and the pusher rod at a point (11) spaced a predetermined distance from the lower end of the pusher rod. The baby carriage is provided with a locking mechanism for locking the opened state of the baby carriage by fixing the state in which the pusher rods are aligned with the support plates and in which the lower ends of the pusher rods abut against the upward surfaces of the rear legs. The locking mechanism comprises a locking member (15) for fixing the distance between the rear region of the rear leg and the lower end of the pusher rod, and a locking pin (14).

3 Claims, 12 Drawing Figures

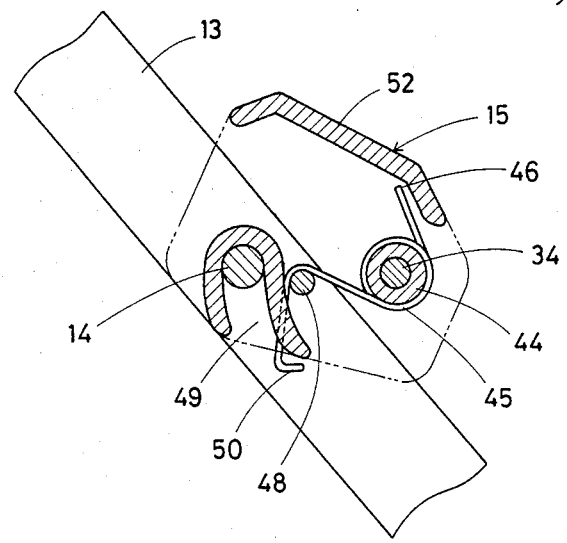
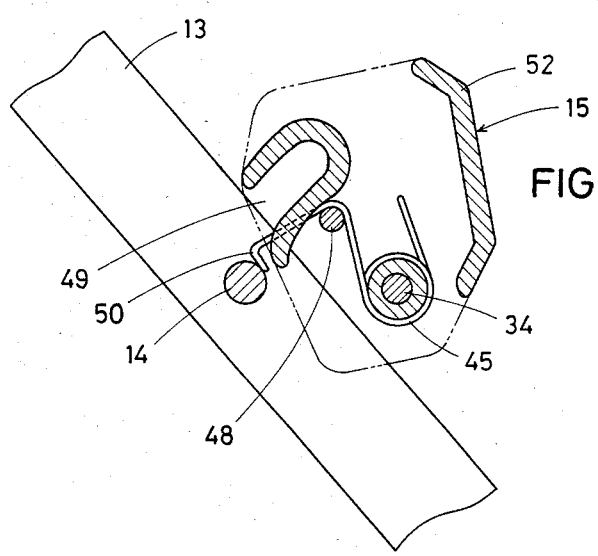
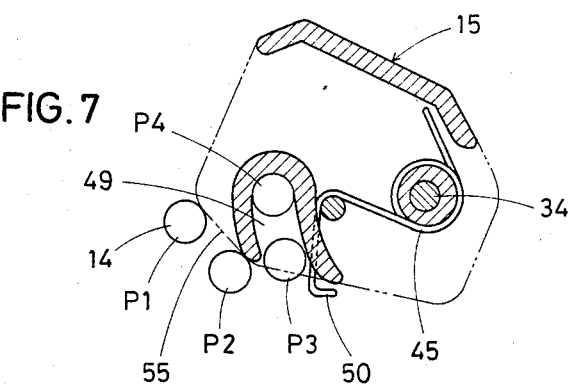

MECHANISM FOR LOCKING THE OPENED STATE OF A BABY CARRIAGE

BACKGROUND OF THE INVENTION

1. Field of the Invention

This invention relates to a mechanism for locking the opened state of a baby carriage.

2. Description of the Prior Art

A foldable baby carriage requires a suitable locking mechanism in order to hold it in its opened state. Such locking mechanisms are to be constructed according to the respective types of baby carriages. Therefore, a locking mechanism constructed for a particular baby carriage cannot necessarily be applied to a different baby carriage.

Thus, locking mechanisms are usually constructed for specific baby carriages, but it is desirable that their mechanisms be simple. To simplify the locking mechanism it is also necessary to pay attention not only to the locking mechanism itself but also to the arrangement of the baby carriage. For example, a simplification of a locking mechanism could result from the arrangement of the baby carriage components.

SUMMARY OF THE INVENTION

Accordingly, a principal object of this invention is to provide a simple locking mechanism while simultaneously improving the arrangement of the baby carriage components.

This invention is applied to a baby carriage arranged in the following manner.

A foldable baby carriage having a pair of front legs, a pair of rear legs, and a pair of pusher rods is arranged so that in its opened state said rear legs extends from an upper front location to a lower rear location and said pusher rods extend rearwardly upward from the intermediate regions between upper and lower ends of said rear legs. Each of said rear legs is connected to the associated pusher rod by a support plate which itself is connected between the intermediate region of the rear leg and a point on the pusher rod spaced a predetermined distance from its lower end, so that in the opened state the pusher rods are aligned with the support plates, with the lower ends of the pusher rods abutting against the substantially upwardly facing surfaces of the rear legs. Therefore, if this state is suitably fixed, it is possible to lock the opened state of the baby carriage. The locking mechanism of this invention comprises a locking member for fixing the distance between the intermediate region of said rear leg and the lower end of said pusher rod, and an engaging pin which engages said locking member.

According to this invention, since the manner of connection from the pusher rod to the rear leg through the support plate, and the attitudes of the members are selected in the manner as described above, simply fixing the distance between the intermediate region of the rear leg and the lower end of the pusher rod results in advantageously fixing the movement in this portion and hence the purpose of fixing said distance can be attained by using simple members such as a locking member and a locking pin which engages said locking member.

In a preferred embodiment of this invention, the locking member is turnably installed on a bracket extending rearwardly from the rear end of the pusher rod, while the locking pin is installed at the point of connection between the rear leg and the support plate. That is, the locking member, in the course of its turning, engages the locking pin and since the locking member has rigidity, said distance is fixed.

Preferably, the locking member is urged by a spring in the direction in which it engages the locking pin, and the configuration of the locking member is such that in the course of approaching the locking pin, the locking member, while sliding in contact with the locking pin, is guided by the latter to thereby change its own attitude in its turning movement to automatically receive the locking pin.

Further, the locking member is provided with an unlocked state retaining member for temporarily retaining the locking member released from the locking pin against the force of the spring, thus making it possible to close the baby carriage without having to maintain the manual operation of the locking member for unlocking purposes. Preferably, this unlocked state retaining member is formed integral with the spring for urging the locking member.

Other objects and features of this invention will become more apparent from the following detailed description to be given with reference to the accompanying drawings.

BRIEF DESCRIPTION OF THE DRAWINGS

FIG. 5 is a side view showing, in section, the arrangement of a locking member 15;

FIGS. 6 and 7 show the function and operation of the locking member 15 and parts related thereto;

DESCRIPTION OF THE PREFERRED EMBODIMENTS AND OF THE BEST MODE OF THE INVENTION

Figure 1:
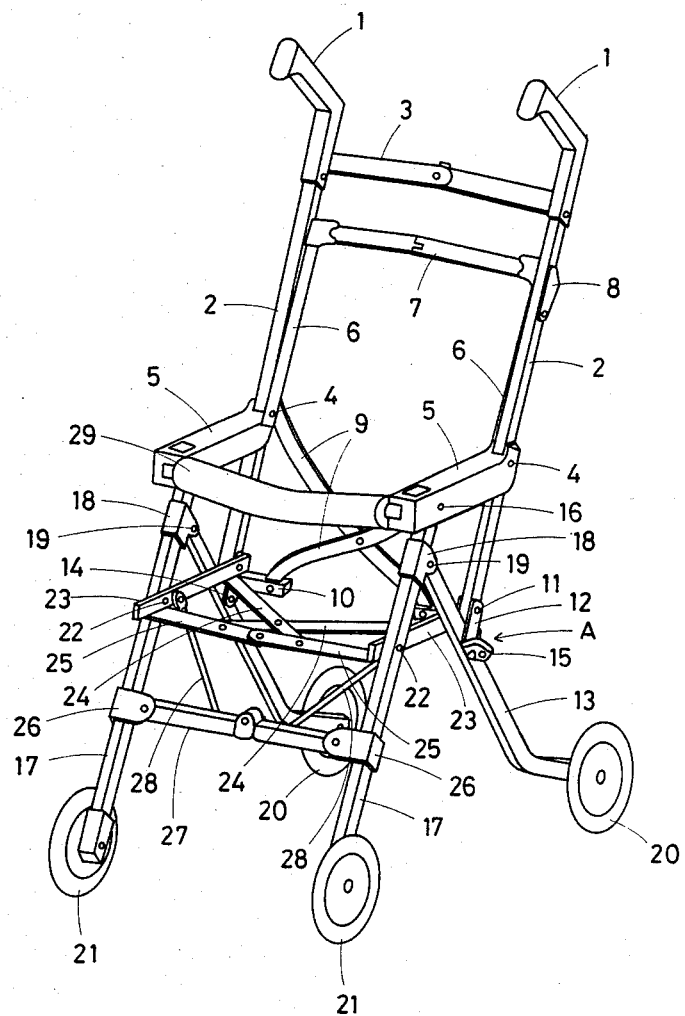
FIG. 1 is a perspective view showing the opened state of a baby carriage employing an embodiment of this invention.

An opened-state locking mechanism according to an embodiment of this invention is provided in order to lock the opened state of a baby carriage as shown in FIG. 1. The place of attachment is shown at A in FIGS. 1 to 3. The arrangement of the baby carriage itself must be understood before such locking mechanism can be understood; thus, the overall arrangement of the baby carriage will first be described below.

Grips 1 for use by the operator in conveying the baby carriage are installed on the upper ends of a pair of pusher rods 2. Further, the upper ends of the pusher rods 2 are connected by a pusher rod upper connecting rod 3 foldable downward only. Handrails 5 are pivotally connected to the intermediate regions of the pusher rods 2 by pivot pins 4 which turnably retain a pair of backrest retaining rods 6 for retaining the backrest of a hammock (not shown) attached to the baby carriage. The upper ends of the backrest retaining rods 6 are connected by a backrest connecting rod 7 forwardly foldable at its middle. The backrest connecting rod 7 is constructed so that when the pair of backrest retaining rods 6 approach each other, it is folded forwardly as described above. The backrest retaining rods 6 are turnably supported by the pivot pin 4, as described above, thereby enabling backreset of the hammock to be reclined. In order to fix some reclining attitudes of the backrest there is provided a reclining adjusting member 8 connected between the pusher rod 2 and the backrest retaining rod 6. A description of the arrangement and operation of the reclining adjusting member 8 is omitted. A pair of cross connecting rods 9 crossing each other and a pair of short connecting rods 10 are connected to relatively lower regions of the pusher rods 2. These cross connecting rods 9 and short connecting rods 10 will be later described in more detail with reference to FIGS. 8 to 11.

One end of a support plate 12 is connected to the associated pusher rod 2 at a point spaced a predetermined distance from the lower end of said pusher rod by a pivot pin 11 and the other end is turnably connected to the intermediate region of the associated rear leg 13 by a pivot locking pin 14. A locking member 15 forming a portion of the mechanism for locking the opened state of the baby carriage is provided adjacent said support plate 12, details of which will be given below with reference to FIGS. 4 to 7.

The front legs 17 are turnably connected to relatively forward regions of the handrails 5 by pivot pins 16. A bracket 18 is attached to the upper end portion of each front leg 17, and the upper end of the rear leg 13 is turnably connected to said bracket 18 by a pivot pin 19 extending through the bracket 18. The lower ends of the pair of rear legs 13 are provided with rear wheels 20, while the lower end of the pair of front legs 17 are provided with front wheels 21. The front end of a transverse connecting rod 23 is turnably connected to a relatively upper region of each front leg 17 by a pivot pin 22, the rear end of said transverse connecting rod 23 being turnably connected to the pusher rod 2 and support plate 12 by the pivot pin 11.

The pair of transverse connecting rods 23 are interconnected by a pair of long cross connecting rods 24 crossing each other and by a pair of short connecting rods 25 which are connected together at their inner ends. When the pair of transverse connecting rods 23 approach each other, the long cross connecting rods 24 are turned to extend transversely, while the pair of short connecting rods 25 are folded with their connected portions projecting forward.

A front leg connecting rod 27 is connected between relatively lower regions of the front legs 17 through brackets 26. The front leg connecting rod 27 is foldable at its middle, the folding direction being so selected that it can be folded only in the direction in which its middle portion is downwardly displaced. In order to control such folding movement of the front leg connecting rod 27, braces 28 are connected each between the front leg connecting rod 27 adjacent the center thereof and the transverse connecting rod 23 at a point spaced rearwardly of the pivot pin 22. The ends of each brace 28 at which it is connected to the front leg connecting rod 27 and to the transverse connecting rod 23 are in the form of a universal joint.

A torso guard 29 is connected between the front ends of the handrails 5. The torso guard 29 serves to protect the torso of a baby sitting in the baby carriage. That is, the torso guard 29 is positioned in front of the torso of a baby placed in the seat of the hammock, said seat being formed on the long cross connecting rod 24 and short connecting rods 25. For this purpose, the torso guard 29 has at least its surface made of a soft material. The torso guard 29 is foldable so that its middle portion projects forward when the pair of handrails 5 approach each other.

The locking mechanism of this invention will now be described.

In the opened state of the baby carriage shown in FIG. 1, the lower ends of the pusher rods 2 abut against the substantially upward surfaces of the rear legs 13 extending from upper front to lower rear, while the support plates 12 are respectively aligned with the associated pusher rods 2. In this state unless the lower ends of the pusher rods 2 are rearwardly deviated to leave the upward surfaces of the rear legs 13 and unless the aligned condition of the pusher rods 2 and support plates 12 is upset, the opened state of the baby carriage will be maintained. Thus, the purpose of providing the locking mechanism is to maintain such state, and the aforesaid locking member 15 forms a portion of the locking mechanism.

Figure 2:
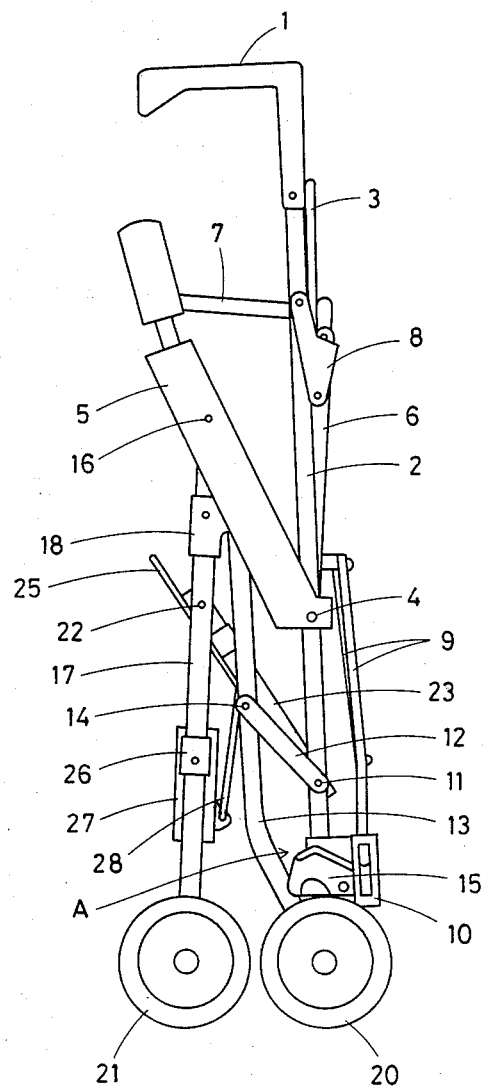
FIG. 2 is a right-hand side view of the baby carriage of FIG. 1 in its closed state.
Figure 3:
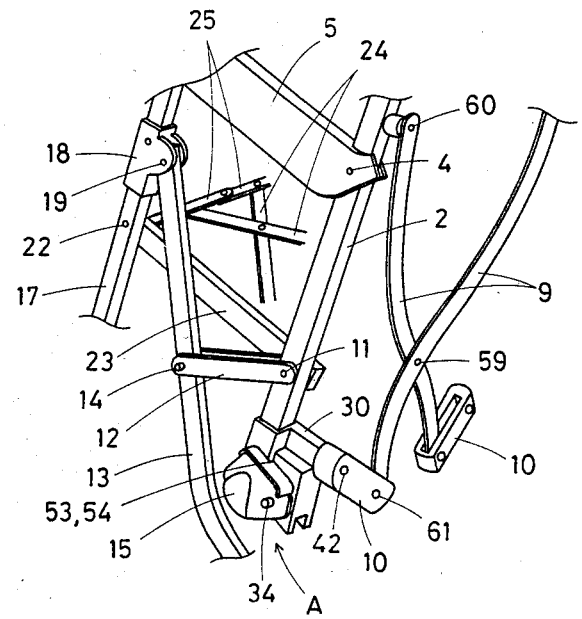
FIG. 3 is a perspective view of a principal portion of the baby carriage shown in FIGS. 1 and 2, illustrating an intermediate state assumed between the opened and closed states.
Figure 4:
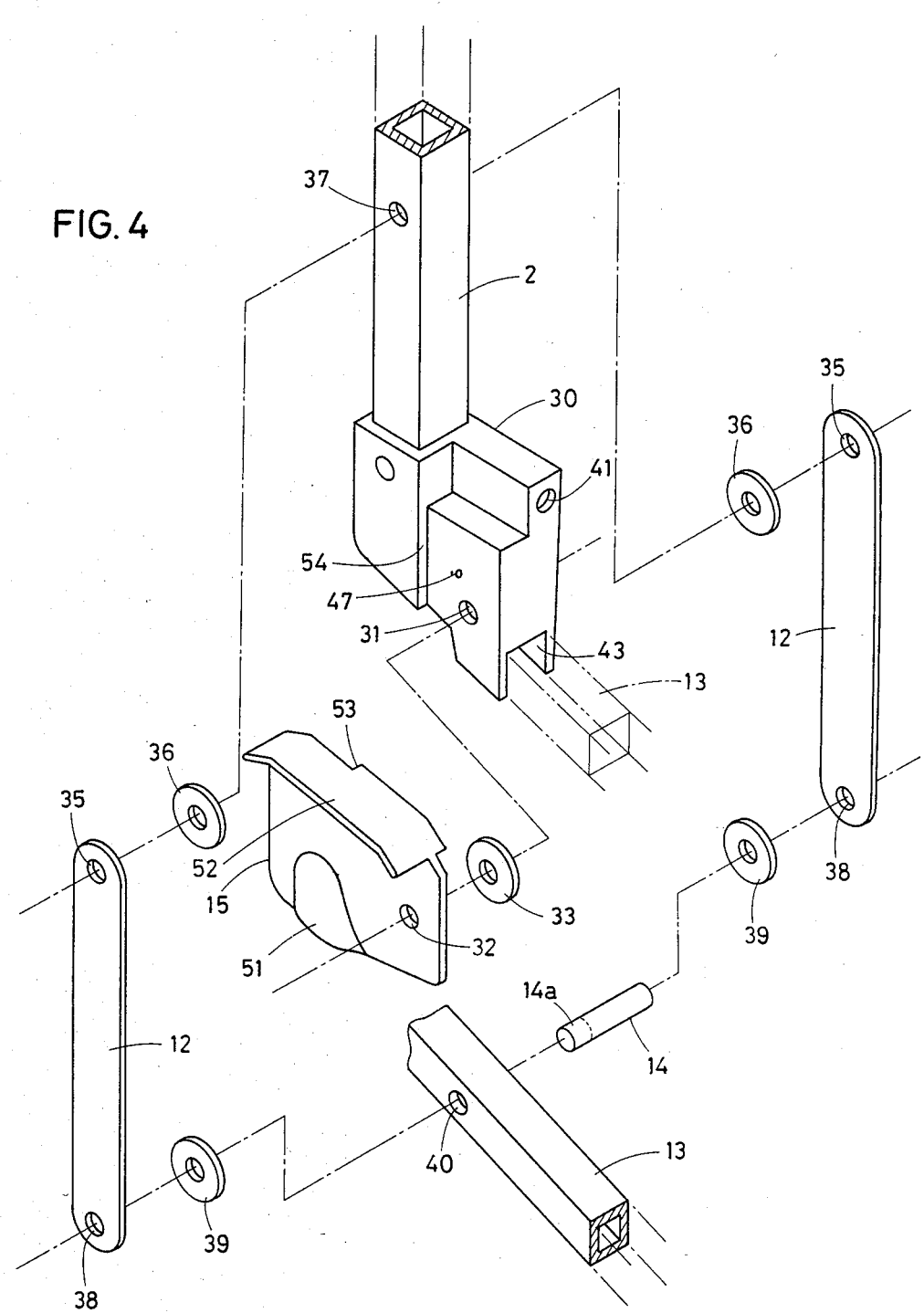
FIG. 4 is an exploded perspective view of a portion A in FIGS. 1 to 3.

FIG. 4 is an exploded perspective view of a portion A in FIGS. 1 to 3. Thus, FIG. 4 illustrates the connection between one pusher rod 2 and the associated rear leg 13 and also shows the locking member 15. FIG. 5 is a side view showing, in section, the arrangement of the locking member 15.

The lower end of the pusher rod 2 is provided with a bracket 30. The bracket 30 has a rearwardly extending portion formed with a transversely extending hole 31. The locking member 15 has a hole 32 to be aligned with the hole 31. Thus, the locking member 15 is turnably supported by the bracket 30 with a pivot pin 34 (FIG. 5) extending through the aligned holes 31,32 with a washer 33 interposed therebetween.

As best shown in FIG. 4, there are two support plates 12 one on each side of each pusher rod 2 and rear leg 13. One hole 35 of one support plate 12, one washer 36, a hole 37 extending through the pusher rod 2, the other washer 36, and one hole 35 of the other support plate 12 are aligned with each other, and in this condition the pivot pin 11 (FIGS. 1 to 3) is inserted to thereby support the two support plates 12 turnably relative to the pusher rod 2. Similarly, the other hole 38 of one support plate 12, one washer 39, a hole 40 extending through the rear leg 13, the other washer 39, and the other hole 38 of the other support plate 12 are aligned with each other and then the pivot locking pin 14 is inserted to thereby support the support plates 12 turnably relative to the rear leg 13. In the inserted state, the portion 14a of the pivot locking pin 14 separated by a dotted line projects beyond the outer support plate 12. This projecting portion 14a will engage the locking member 15.

The rearward surface of the bracket 30 is formed with a hole 41 for receiving a pivot pin 42 (FIG. 3) extending through one end of the short connecting rod 14 to turnably support the short connecting rod 10 relative to the bracket 30, i.e., the pusher rod 2.

Preferably, the downward surface of the bracket 30 is formed with a recess 43 for receiving the rear leg 13.

Fitted on the pivot pin 34 for rotatably supporting the locking member 15 relative to the bracket 30 is a sleeve 44, as shown in FIG. 5, and a torsion spring 45 is fitted on said sleeve. One leg of the torsion spring 45 is bent at right angles to the paper of FIG. 5 and inserted in a hole 47 (FIG. 4) formed in the bracket 30 and is fixed to the latter. The other leg of the torsion spring 45 is engaged with a boss 48 formed on the locking member 15 and extends until its portion is opposed to the inside of a locking recess 49 formed in the locking member 15. The torsion spring 45 exerts a force which tends to move its legs away from each other, so that the locking member 15 is constantly urged by the torsion spring 45 to turn around the axis of the pivot pin 34 in a counterclockwise direction as viewed in FIG. 5. The locking recess 49 serves to receive the pivot locking pin 14 and is defined by a wall extending along arcs with the center at the pivot pin 34. The front end portion of the other leg of the torsion spring 45 partly opposed to the locking recess 49 is bent in a direction which crosses the axis of the pivot locking pin 14, whereby an unlocked state retaining member 50 to be later described is formed.

Corresponding to the portion formed with said locking recess 49, as shown in FIG. 4, a cover 51 is formed by bulging out the outer surface of the locking member 15. Further, the top of the locking member 15 is formed with an operating rib 52 serving as a finger resting portion for turning the locking member 15. The inner end edge of the operating rib 52 has a step portion 53 which is adapted to engage a step portion 54 in the bracket 30, as shown in FIG. 3, whereby the end of the counterclockwise turning movement of the locking member 15 is defined. Therefore, when the step portions 53 and 54 are engaged with each other, the locking member 15 can be rotated around the axis of the pivot pin only in a clockwise direction.

In the condition of FIG. 5, the pivot locking pin 14 has been received in the locking recess 49, and hence the distance between the pivot locking pin 14 and the pivot pin 34 is fixed. That is, the distance between the intermediate region of the rear leg 13 and the lower end of the pusher rod 2 is fixed. In this condition, the lower end of the pusher rod 2 cannot move in any direction and hence the opened state of the baby carriage has been locked.

When it is desired to change the baby carriage from its opened to its closed state, an operation for canceling said locking is performed. To this end, the locking member 15 is turned clockwise through the operating rib 52 against the force of the torsion spring 45. This state is shown in FIG. 6. Referring to FIG. 6, the pivot locking pin 14 escapes from the locking recess 49 of the locking member 15. And the unlocked state retaining member 50 formed at the other end of the torsion spring 45 is abutting against the pivot locking pin 14. In spite of the action of the torsion spring 45, therefore, the unlocked state retaining member 50 abutting against the pivot locking pin 14 inhibits the counterclockwise turning of the locking member 15, so that even if the force being applied thereto through the operating rib 52 is removed, the state shown in FIG. 6 is maintained. After the state of FIG. 6 has thus been established, a folding operation on the baby carriage is initiated. Such operation will be described below.

FIG. 7 shows the relation between the locking member 15 and the pivot locking pin 14 in changing the baby carriage from its closed to its opened state. As is clear from the connections shown in FIG. 3, pivot locking pin 14 approaches the locking member 15 while describing an arc with the center at the pivot pin 11 and with the radius represented by the support plate 12. FIG. 7 illustrates the positional relation between the pivot locking pin 14 and the locking member 15 in the final stage of approach of the pivot locking pin 15, it being noted that for the sake of convenience of drawing, the locking member 15 is shown as fixed in position. When the pivot locking pin 14 is displaced from position P1 to position P2, it moves in slide contact with the slope surface 55 of the locking member 15. Therefore, when the pivot locking pin 14 moves from position P1 to position P2, the locking member 15 is slightly turned clockwise around the axis of the pivot pin 34. This clockwise turning is against the force of the torsion spring 45. When the pivot locking pin 14 further moves from position P2 to position P3, this movement opens the locking recess 49, so that the pivot locking pin 14 instantaneously moves into the innermost region of the locking recess 49. In addition, it will be understood from the just described path of travel of the pivot locking pin 14 relative to the recess 49 that the unlocked state retaining member 50 does not interfere with the movement of the pivot locking pin 14. In this way, when the closed state of the baby carriage is changed into the opened state, the locking member 15 automatically engages the pivot locking pin 14 in the final stage, whereby the locked state can be automatically obtained.

Figure 8:
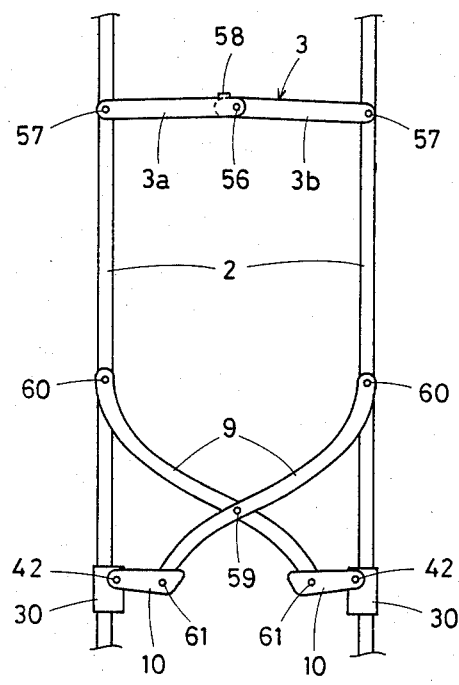
FIG. 8 is a view showing the connection between the pusher rods 2, a pusher rod upper connecting rod 3, cross connecting rods 9, and short connecting rods 10, looking at the back of the baby carriage when the latter is in its opened state.
Figure 9:
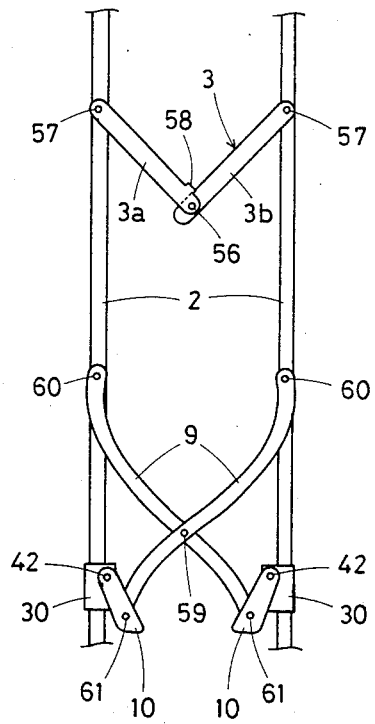
FIG. 9 is a view similar to FIG. 8 but showing the closed state of the baby carriage.

Referring to FIGS. 8 to 11, the pusher rod upper connecting rod 3 comprises a left-hand portion 3a and right-hand portion 3b which are turnably connected together by a pivot pin 56. Further, the ends of the pusher rod upper connecting rod 3 are turnably connected to the pusher rods 2 by pivot pins 57. In the opened state shown in FIG. 8, the left-hand and right-hand portions 3a and 3b are kept somewhat upwardly bent. That is, the pivot pin 56 is positioned above a line connecting the right and left pivot pins 57. However, there is no possibility of the pusher rod upper connecting rod 3 further bending upward, because the left-hand portion 3a is formed with a stop 58 to be contacted by the upper surface of the end of the right-hand portion 3b. However, as shown in FIG. 9, the pusher rod upper connecting rod 3 is free to bend downward. In the course of this downward bending, the pusher rod upper connecting rod 3 changes from its somewhat upwardly bent state to its downwardly bent state thereby passing through its straight state. The purpose for maintaining the pusher rod upper connecting rod 3 in the state in which it is bent in the direction opposite to that of its inherent bending when the baby carriage is in its opened state, is to make it possible to advantageously stop by the stop 58 the force which urges the pair of pusher rods 2 toward each other.

In addition, in order to prevent inadvertent downward bending of the pusher rod upper connecting rod 3 in the opened state of the baby carriage, one of the mating surfaces of the left-hand and right-hand portions 3a and 3b may be provided with a recess and the other with a projection adapted to fit in said recess. This combination of a recess and a projection ensures that the pusher rod upper connecting rod 3 will not be downwardly bent unless a downward force greater than a certain degree is applied.

Further, the pusher rod upper connecting rod 3 is arranged to be bendable only downward. This arrangement has the advantage that in the closed state of the baby carriage, the pusher rod upper connecting rod 3, when bent, is located without projecting beyond the closed baby carriage. However, if such advantage is not wanted, the pusher rod upper connecting rod 3 may be arranged so that it is bendable only upward. In this case, the pusher rod upper connecting rod 3 may possibly project upwardly beyond the grips 1 in the closed state of the baby carriage.

The pair of cross connecting rods 9 are turnably connected together by a pivot pin 59. The upper ends of the cross connecting rods 9 are turnably connected to the pusher rods 2 by pivot pins 60. The lower ends of the cross connecting rods 9 are turnably connected to the short connecting rods 10 by pivot pins 61. The short connecting rods 10 are turnably connected to the brackets 30 by pivot pins 42, as described above.

Figure 10:
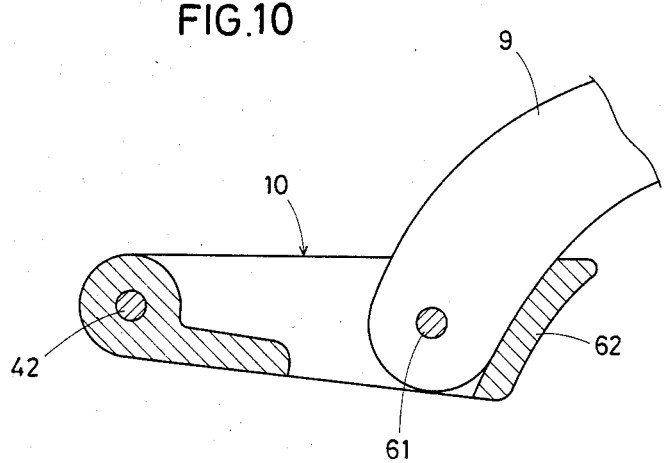
FIG. 10 is an enlarged view of the connection between the cross connecting rod 9 and the short connecting rod 10, corresponding to the state of FIG. 8.
Figure 11:
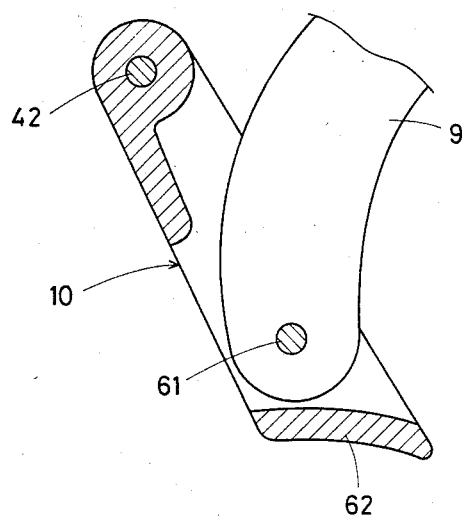
FIG. 11 is a view similar to FIG. 10 but corresponding to the state of FIG. 9.

The short connecting rods 10 have a shape adapted to receive the lower ends of the cross connecting rods 9. As best shown in FIGS. 10 and 11, the short connecting rod 10 is formed with a stop wall 62 for defining the range of turning movement of the cross connecting rod 9 around the axis of the pivot pin 61. In the opened state of the baby carriage, the stop wall 62 abuts against the lateral surface of the cross connecting rod 9 to inhibit the angle between the cross connecting rod 9 and the short connecting rod 10 from increasing. However, when the opened state is changed to the closed state, the turning movement around the axis of the pivot 61 for the cross connecting rod 9 and short connecting rod 10 is not hindered.

In addition, the cross connecting rods 9 are bent in S or Z form. Thanks to such a shape, the space defined between the cross connecting rods 9 and above the pivot pin 59 in the FIG. 8 state is increased as compared with the case where the cross connecting rods are straight. This space is the one in which the backrest of the hammock is to be positioned. Thus, the fact that this space is large means that that reclining angle of the backrest can be increased.

In the arrangement shown in FIGS. 8 and 9, the distance between the pusher rods 2 is positively determined in the opened state of the baby carriage. That is, the pair of cross connecting rods 9 and the pair of short connecting rods 10 prevent an increase in the distance between the pair of pusher rods 2, while the pusher rod upper connecting rod 3 keeps the distance between the pair of pusher rods 2 constant, whereby the distance between the pair of pusher rods 2 is positively determined.

How the aforesaid baby carriage is opened and closed will now be described. In the opened state of the baby carriage, the pusher rods 2 are aligned with the support plates 12 and locked by the locking members 15.

When it is desired to change this opened state to the closed state, first, as shown in FIG. 6 the locking member 15 is turned through the operating rib 52 to cancel the locked state. Next, the upper ends of the pusher rods 2 are pushed forward while downwardly bending the pusher rod upper connecting rod 3. In response thereto, the transverse connecting rods 23 rearwardly pull the front legs 17. This state is shown in FIG. 3.

With the operation described above, there has also been produced a decrease in the widthwise dimension of the baby carriage. That is, in response to the bending of the pusher rod upper connecting rod 3, the distance between the pair of pusher rods 2 is decreased, in response to which the cross connecting rods 9 and short connecting rods 10 are turned so as to decrease the distance between the pair of pusher rods 2. Further, in response to the decrease in the distance between the pair of pusher rods 2, the distance between the pair of backrest retaining rods 6 is also decreased, bending the backrest connecting rod 7. Further, the distance between the pair of handrails 5 is also decreased, bending the torso guard 29. Further, as the distance between the pair of transverse connecting rods 23 is decreased, the long cross connecting rods 24 and short connecting rods 25 are turned.

When the folding operation proceeds to the extent that the support plates 12 are turned upside down, the rear ends of the transverse connecting rods 23 are downwardly tilted and this action is transmitted to the front leg connecting rod 27 through the braces 28, so that the front leg connecting rod 27 is also downwardly bent to decrease the distance between the pair of front legs 17. Such operation progresses until the closed state shown in FIG. 2 is obtained. Since the two front wheels 21 are substantially on a level with the two rear wheels 20, the baby carriage is capable of standing by itself even in this closed state.

The change of the closed state to the opened state can be attained, for example, by holding the middle region of the pusher rod upper connecting rod 3 by hand to lift the entire baby carriage in the air. In response thereto, the weight of the baby carriage works, causing the support plates 12 to turn around the axes of the pivot locking pins 14. Concurrently, the handrails 5 and transverse connecting rods 23 are turned to assume a horizontal state. The aforesaid turning movement of the support plates 12 and transverse connecting rods 23 causes the front legs 17 to turn away from the rear wheels 13.

Further, the widthwise dimension of the baby carriage is also concurrently increased. That is, since the entire baby carriage has been lifted in the air by the hand gripping the middle portion of the pusher rod upper connecting rod 3, as described above, the pusher rod upper connecting rod 3 tends to be straightened under the weight of the baby carriage. Therefore, the distance between the pair of pusher rods 2 is increased, attended with the turning of the cross connecting rods 9 and short connecting rods 10. Further, the distance between the pair of handrails 5 is increased and the torso guard 29 tends to be straightened. Further, the distance between the pair of transverse connecting rods 23 is increased and in response thereto the long cross connecting rods 24 and short connecting rods 25 are turned. Further, in the course of the transverse connecting rods 23 becoming horizontal, the braces 28 pull up the front leg connecting rod 27 until the latter is straightened, increasing the distance between the pair of front legs 17. And in the final stage of the opening operation, as described with reference to FIG. 7, the pivot locking pins 14 tend to fit in the locking recesses 49, finally providing the locked state shown in FIG. 5. In this manner the opened state of the baby carriage is established and automatically locked.

Figure 12:
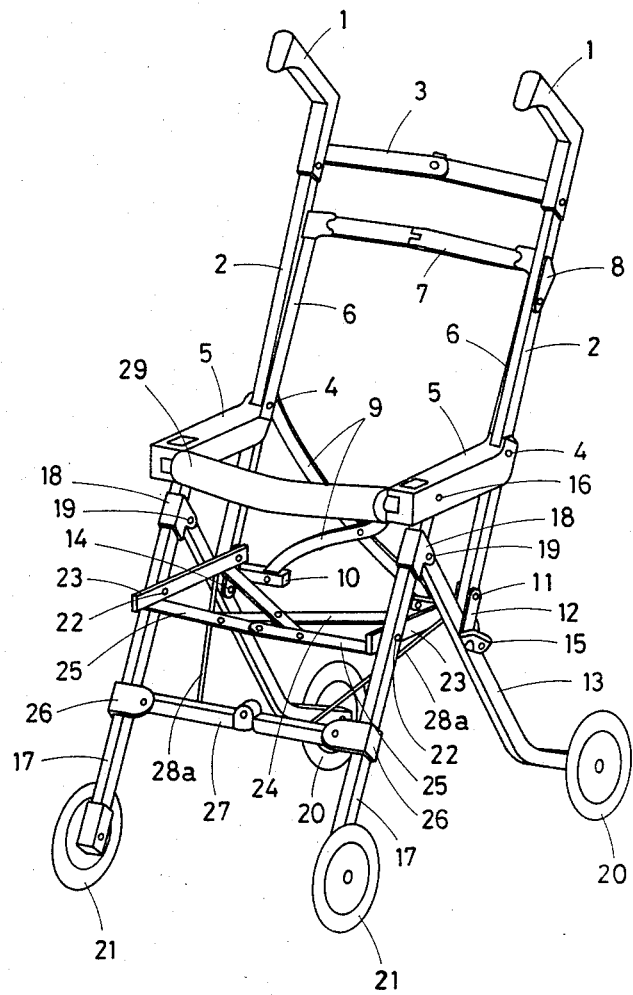
FIG. 12 is a perspective view showing the opened state of another example of a baby carriage employing this invention.

FIG. 12 is a perspective view showing the opened state of another example of a baby carriage employing the embodiment of this invention. As is clear from a comparison with FIG. 1, this baby carriage is similar in almost every respect to the one shown in FIG. 1. The difference is that while the braces 28 of FIG. 1 are connected between the transverse connecting rods 23 and front connecting rod 27, in FIG. 12 braces 28a are connected between the rear legs 13 and the front leg connecting rod 27. The rest of the arrangement is exactly the same.

The employment of the arrangement shown in FIG. 12 has no direct bearing on carrying out this invention but in the embodiment of FIG. 12 the opening and closing of the baby carriage can be effected more smoothly. That is, in the arrangement shown in FIG. 1, it is impossible to apply a bending force to the front leg connecting rod 27 through the braces 28 in the early stage of the change of the baby carriage from its opened to its closed state. For this reason, the bending operation of the front leg connecting rod 27 proceeds with some time lag as compared with that of the other parts. In contrast, in the example shown in FIG. 12, a bending force can be transmitted to the front leg connecting rod 27 through the braces 28a in the early stage of the bending operation. That is, substantially in the early stage of the change of the baby carriage from its opened to its closed state, the rear legs 13 perform a unidirectional motion such that they approach the front legs 17. Thus, it follows that the braces 28a transmits a motion of the same direction throughout the operation. And at the same time as the rear and front legs 13 and 17 approach each other, the front leg connecting rod 27 is bent. These facts make the folding operation smooth.

An embodiment of this invention has so far been fully described, but in carrying out the invention it is not limited to this embodiment. This will be considered below.

A baby carriage to which this invention is applied is required only to meet the following condition. It is a foldable baby carriage having a pair of front legs, a pair of rear legs, and a pair of pusher rods wherein in the opened state of the baby carriage, said rear legs extend from upper front to lower rear and said pusher rods extend rearwardly upward from the intermediate regions of the rear legs, and wherein each rear leg and the associated pusher rod are connected together by a support plate which is connected to the intermediate region of the rear leg and to the pusher rod at a point spaced a predetermined distance from the lower end of the pusher rod, so that if the pusher rods are aligned with the support plates and the state in which the lower ends of the pusher rods abut against the upward surfaces of the rear legs is fixed, then the opened state of the baby carriage can be locked.

As for the locking mechanism, it is only necessary that in a baby carriage such as the one described above, it fixes the distance between the intermediate regions of the rear ends and the lower ends of the pusher rods. To this end, it may comprise a locking member and a locking pin which engages said locking member. The unlocked state retaining member need not be integral with the end of the spring. It may be constructed separate from the spring. Further, in the embodiment, the pivot locking pins 14 have been used also to serve as pins for attaching the support plates to the rear legs, but the arrangement is not limited thereto and separate locking pins may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mechanism for locking the opened state of a foldable baby carriage having a pair of front legs, a pair of rear legs and a pair of pusher rods, wherein in the opened state of the baby carriage, said rear legs extend from an upper front location to a lower rear location and said pusher rods extend rearwardly upward from regions intermediate the ends of said rear legs, and wherein each of said rear legs is connected to the associated pusher rod by a support plate which is connected between the intermediate region of the respective rear leg and the corresponding pusher rod at a point spaced a predetermined distance from the lower end of the pusher rod, the arrangement being such that said pusher rods are aligned with said support plates while the lower ends of said pusher rods abut against upward surfaces of the rear legs, said locking mechanism comprising a locking member (15) for fixing the distance between the intermediate region of the rear leg and the lower end of the pusher rod, a locking pin (14) adapted to engage said locking member, and a torsion spring (45) having first and second spring ends, first means (30, 47) operatively connecting said first spring end to said pusher rod, second means (48) operatively connecting said second spring end to said locking member (15), whereby said locking member (15) is constantly urged by said torsion spring (45) in a direction which causes the locking member (15) to engage said locking pin (14), said locking member (15) having such a locking recess (49) that said locking recess (49) automatically receives said locking pin (14) while moving in a slide contact with said locking pin when said locking member (15) approaches said locking pin (14), said second spring end being shaped to form an unlocked state retaining member (50) which abuts against said locking pin (14) for retaining the locking member (15) disengaged from said locking pin (14) against the force of said torsion spring (45).

2. The mechanism for locking the opened state of a baby carriage as set forth in claim 1, wherein said locking member is turnably installed on a bracket extending rearwardly from the lower end of the pusher rod, while said locking pin is installed at the point of connection between the rear leg and the support plate.

3. The mechanism for locking the opened state of a baby carriage at set forth in claim 1, wherein said unlocked state retaining member (50) is integral with said torsion spring (45).

* * * * *